US007327848B2

(12) United States Patent
Squibbs

(10) Patent No.: US 7,327,848 B2
(45) Date of Patent: Feb. 5, 2008

(54) VISUALIZATION OF SPATIALIZED AUDIO

(75) Inventor: Robert Francis Squibbs, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 826 days.

(21) Appl. No.: 10/683,812

(22) Filed: Oct. 9, 2003

(65) Prior Publication Data

US 2004/0141622 A1 Jul. 22, 2004

(30) Foreign Application Priority Data

Jan. 21, 2003 (GB) ................................ 0301304.2

(51) Int. Cl.

| | |
|---|---|
| ***H04R 29/00*** | (2006.01) |
| ***H04R 3/00*** | (2006.01) |
| ***H04R 5/02*** | (2006.01) |
| ***H04R 5/00*** | (2006.01) |
| ***G08B 5/00*** | (2006.01) |
| ***A63J 5/10*** | (2006.01) |
| ***G09B 15/00*** | (2006.01) |

(52) U.S. Cl. .......................... 381/56; 381/92; 381/306; 381/1; 381/124; 340/815.46; 340/815.65; 84/464 R; 84/477 R; 84/484

(58) Field of Classification Search .................. 381/56, 381/92, 1, 306, 61, 63, 124, 310; 84/464 R, 84/477 R, 484; 340/815.46, 815.65

See application file for complete search history.

(56) References Cited

U.S. PATENT DOCUMENTS 5,272,756 A * 12/1993 Tanaka et al. ................ 381/12
5,465,302 A 11/1995 Lazzari et al. ................ 381/92
5,749,073 A * 5/1998 Slaney ........................ 704/278
5,784,096 A * 7/1998 Paist ........................... 348/32
5,812,688 A 9/1998 Gibson ....................... 381/119
6,009,396 A 12/1999 Nagata ....................... 704/270
6,021,204 A * 2/2000 Eastty ......................... 381/12
7,162,043 B2 * 1/2007 Sugiyama et al. ............ 381/92

(Continued)

FOREIGN PATENT DOCUMENTS

EP 563832 A1 * 10/1993

(Continued)

OTHER PUBLICATIONS

Abstract of JP 2002-354366, Patent Abstracts of Japan, (1998,2003).

(Continued)

*Primary Examiner*—Vivian Chin
*Assistant Examiner*—Devona E Faulk
(74) *Attorney, Agent, or Firm*—Ladas & Parry LLP

(57) ABSTRACT

A method and apparatus is provided for presenting a user with a visual indication of the likely user-perceived location of sound sources in an audio field generated from left and right audio channel signals. To produce this visual indication, corresponding components in the left and right channel signals are detected by a correlation arrangement. These corresponding components are then used by a source-determination arrangement to infer the presence of at least one sound source and to determine the azimuth location of this source within the audio field. A display processing arrangement causes a visual indication of the sound source and its location to be presented to the user.

26 Claims, 3 Drawing Sheets

U.S. PATENT DOCUMENTS

| | | | | |
|---|---|---|---|---|
| 2002/0150263 | A1* | 10/2002 | Rajan | 381/92 |

FOREIGN PATENT DOCUMENTS

| | | | | |
|---|---|---|---|---|
| EP | 1 132 720 | A2 | * | 9/2001 |
| GB | 2 319 346 | A | | 5/1998 |
| JP | 07084028 | A1 | * | 9/1993 |
| JP | 2002354366 | A | * | 12/2002 |

OTHER PUBLICATIONS

Abstract of JP 07-084028, Patent Abstracts of Japan, (1998,2003).

Greuel, Christian, et al., "Sculpting 3D worlds with music; Advanced texturing techniques," *Proceedings of SPIE*, vol. 2653, pp. 306-315 (Feb. 1996).

Kashino, Kunio, et al., "Sound Source Identification for Ensemble Music Based on Music Stream Networks," *Journal of Japanese Society for Artificial Intelligence*, vol. 13, No. 2, pp. 962-970 (Nov. 1998).

* cited by examiner

VISUALIZATION OF SPATIALIZED AUDIO

FIELD OF THE INVENTION

The present invention relates to a method and apparatus for providing a visual indication of the likely user-perceived location of one or more sound sources in an audio field generated from left and right audio channel signals.

BACKGROUND OF THE INVENTION

Methods of acoustically locating a real-world sound source are well known and usually involve the use of an array of microphones; U.S. Pat. No. 5,465,302 and U.S. Pat. No. 6,009,396 both describe sound source location detecting systems of this type. By determining the location of the sound source, it is then possible to adjust the processing parameters of the input from the individual microphones of the array so as to effectively 'focus' the microphone on the sound source, enabling the sounds emitted from the source to be picked out from surrounding sounds. However, this prior art is not concerned with the same problem as that addressed by the present invention where the starting point is left and right audio channel signals that have been conditioned to enable the generation of a spatialized sound field to a human user.

It is, of course, well known to process a sound-source signal to form left and right audio channel signals so conditioned that when supplied to a human user via (at least) left and right audio output devices, the sound source is perceived by the user as coming from a particular location; this location can be varied by varying the conditioning of the left and right channel signals.

More particularly, the human auditory system, including related brain functions, is capable of localizing sounds in three dimensions notwithstanding that only two sound inputs are received (left and right ear). Research over the years has shown that localization in azimuth, elevation and range is dependent on a number of cues derived from the received sound. The nature of these cues is outlined below.

Azimuth Cues—The main azimuth cues are Interaural Time Difference (ITD—sound on the right of a hearer arrives in the right ear first) and Interaural Intensity Difference (IID—sound on the right appears louder in the right ear). ITD and IIT cues are complementary inasmuch as the former works better at low frequencies and the latter better at high frequencies.

Elevation Cues—The primary cue for elevation depends on the acoustic properties of the outer ear or pinna. In particular, there is an elevation-dependent frequency notch in the response of the ear, the notch frequency usually being in the range 6-16 kHz depending on the shape of the hearer's pinna. The human brain can therefore derive elevation information based on the strength of the received sound at the pinna notch frequency, having regard to the expected signal strength relative to the other sound frequencies being received.

Range Cues—These include:

- loudness (the nearer the source, the louder it will be; however, to be useful, something must be known or assumed about the source characteristics),
- motion parallax (change in source azimuth in response to head movement is range dependent), and
- ratio of direct to reverberant sound (the fall-off in energy reaching the ear as range increases is less for reverberant sound than direct sound so that the ratio will be large for nearby sources and small for more distant sources).

It may also be noted that in order avoid source-localization errors arising from sound reflections, humans localize sound sources on the basis of sounds that reach the ears first (an exception is where the direct/reverberant ratio is used for range determination).

Getting a sound system (sound producing apparatus) to output sounds that will be localized by a hearer to desired locations, is not a straight-forward task and generally requires an understanding of the foregoing cues. Simple stereo sound systems with left and right speakers or headphones can readily simulate sound sources at different azimuth positions; however, adding variations in range and elevation is much more complex. One known approach to producing a 3D audio field that is often used in cinemas and theatres, is to use many loudspeakers situated around the listener (in practice, it is possible to use one large speaker for the low frequency content and many small speakers for the high-frequency content, as the auditory system will tend to localize on the basis of the high frequency component, this effect being known as the Franssen effect). Such many-speaker systems are not, however, practical for most situations.

For sound sources that have a fixed presentation (non-interactive), it is possible to produce convincing 3D audio through headphones simply by recording the sounds that would be heard at left and right eardrums were the hearer actually present. Such recordings, known as binaural recordings, have certain disadvantages including the need for headphones, the lack of interactive controllability of the source location, and unreliable elevation effects due to the variation in pinna shapes between different hearers.

To enable a sound source to be variably positioned in a 3D audio field, a number of systems have evolved that are based on a transfer function relating source sound pressures to ear drum sound pressures. This transfer function is known as the Head Related Transfer Function (HRTF) and the associated impulse response, as the Head Related Impulse Response (HRIR). If the HRTF is known for the left and right ears, binaural signals can be synthesized from a monaural source. By storing measured HRTF (or HRIR) values for various source locations, the location of a source can be interactively varied simply by choosing and applying the appropriate stored values to the sound source to produce left and right channel outputs. A number of commercial 3D audio systems exist utilizing this principle. Rather than storing values, the HRTF can be modeled but this requires considerably more processing power.

The generation of binaural signals as described above is directly applicable to headphone systems. However, the situation is more complex where stereo loudspeakers are used for sound output because sound from both speakers can reach both ears. In one solution, the transfer functions between each speaker and each ear are additionally derived and used to try to cancel out cross-talk from the left speaker to the right ear and from the right speaker to the left ear.

Other approaches to those outlined above for the generation of 3D audio fields are also possible as will be appreciated by persons skilled in the art. Regardless of the method of generation of the audio field, most 3D audio systems are, in practice, generally effective in achieving azimuth positioning but less effective for elevation and range. However, in many applications this is not a particular problem since azimuth positioning is normally the most important. As a result, systems for the generation of audio fields giving the perception of physically separated sound sources range from full 3D systems, through two dimensional systems (giving, for example, azimuth and elevation position variation), to one-dimensional systems typically giving only azimuth position variation (such as a standard stereo sound system). Clearly, 2D and particularly 1D systems are technically less complex than 3D systems as illustrated by the fact that stereo sound systems have been around for very many years.

As regards the purpose of the generated audio field, this is frequently used to provide a complete user experience either alone or in conjunction with other artificially-generated sensory inputs. For example, the audio field may be associated with a computer game or other artificial environment of varying degree of user immersion (including total sensory immersion). As another example, the audio field may be generated by an audio browser operative to represent page structure by spatial location.

However, in systems that provide a combined audio-visual experience, it the visual experience that takes the lead regarding the positioning of elements having both a visual and audio presence; in other words, the spatialisation conditioning of the audio sound signals is done so that the sound appears to emanate from the visually-perceivable location of the element rather than the other way around.

It is an object of the present invention to provide a method and apparatus for providing a visual indication of the likely user-perceived location of one or more sound sources in an audio field generated from left and right audio channel signals.

SUMMARY OF THE INVENTION

According to one aspect of the present invention, there is provided a method of providing a visual indication of the likely user-perceived location of sound sources in an audio field generated from left and right audio channel signals, the method comprising the steps of:

(a) receiving the left and right audio channel signals;

(b) pairing components in the left and right channel signals by detecting left and right channel components, potentially offset in time, that match in pitch and in amplitude variation profile and using the paired components to infer the presence of at least one sound source and determine its azimuth location; and (c) displaying a visual indication of at least one sound source inferred in step (b) such that the position at which this indication is displayed is indicative of the azimuth location of the sound source concerned.

According to another aspect of the present invention, there is provided apparatus for providing a visual indication of the likely user-perceived location of sound sources in an audio field generated from left and right audio channel signals, the apparatus comprising:

- an input interface for receiving the left and right audio channel signals;
- a correlation arrangement for pairing components in the left and right channel signals by detecting left and right channel components, potentially offset in time, that match in pitch and in amplitude variation profile;
- a source-determination arrangement for using the paired components to infer the presence of at least one sound source and determine its azimuth location; and
- a display processing arrangement for causing the display, on a display connected thereto, of a visual indication of at least one sound source inferred by the source-determination arrangement such that the position at which this indication is displayed is indicative of the azimuth location of the sound source concerned.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
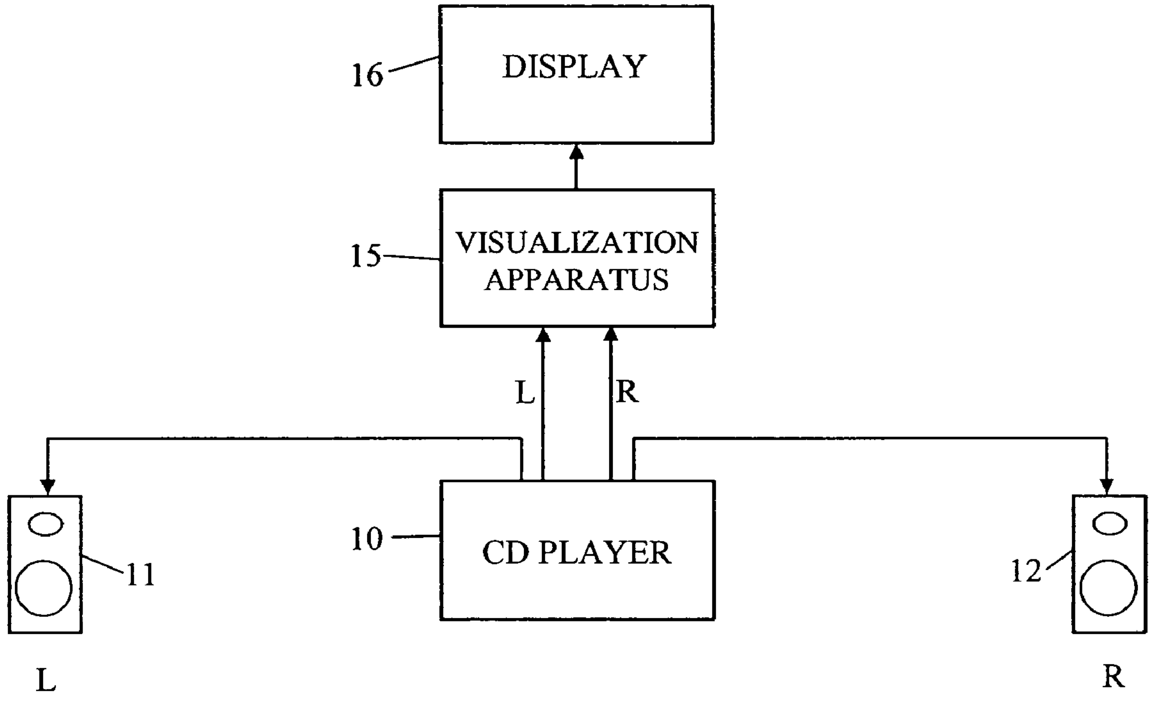
FIG. 1 is a diagram illustrating the connection of visualization apparatus embodying the invention to a CD player.

FIG. 1 shows the connection of visualization apparatus 15 embodying the present invention to a CD player 10. The CD player is a stereo player with left (L) and right (R) audio channel outputs feeding left and right audio output devices, here shown as loudspeakers 11 and 12 though the output devices could equally be stereo headphones.

The left and right audio channel signals are also fed to the visualisation apparatus either in the form of the same analogue electrical signals used to drive the loudspeakers 11 and 12, or in the form of the digital audio signals produced by the CD player for conversion into the aforesaid analogue signals.

The visualization apparatus 15 is operative to process the left and right audio channel signals it receives such as to cause the display on visual display 16 of visual indications of the likely user-perceived location of sound sources in the audio field generated from left and right audio channel signals by the loudspeakers 11 and 12. The display 16 may be any suitable form of display either connected directly to the apparatus 15 or remotely connected via a communications link such as a short-range wireless link.

Figure 2:
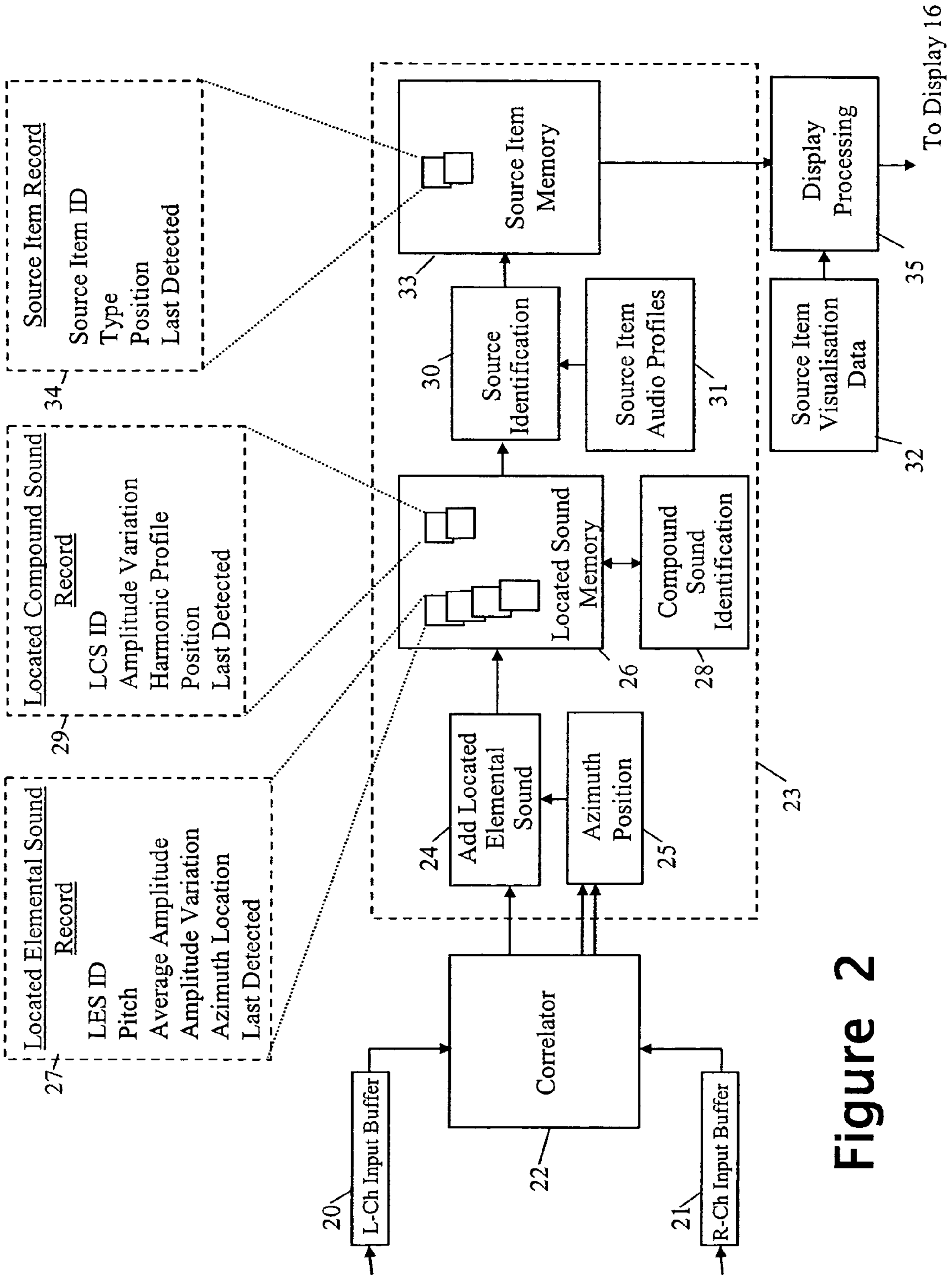
FIG. 2 is a functional block diagram of the FIG. 1 visualization apparatus.

FIG. 2 is a functional block diagram of the visualization apparatus 15. The apparatus comprises:

- an input interface, formed by input buffers 20 and 21, for receiving the left and right audio channel signals;
- a correlator 22 for detecting corresponding components in the left and right channel signals;
- a source-determination arrangement 23 for using the detected corresponding components to infer the presence of at least one sound source and determine its azimuth location in the audio field; and
- a display processing stage 35 for causing the display, on display 16, of a visual indication of at least one of the detected sound sources and its location.

The present embodiment of the visualization apparatus 15 is arranged to carry out its processing in half-second processing cycles. In each cycle a half-second segment of the audio channel signals produced by the player 10 are analysed to determine the presence and location of sound sources represented in that segment; whilst this processing is repeated every half second for successive segments of the audio channel signals, detected sound sources are remembered across processing cycles and the display processing stage is arranged to cause the production of visual indications in respect of all sound sources detected during the course of a sound passage of interest.

Considering the apparatus 15 in more detail, in the present embodiment the input buffers 20 and 21 are digital in form with the left and right audio channel signals received by the apparatus 15 either being digital signals or, if of analogue form, being converted to digital signals by converters (not shown) before being fed to the buffers 20, 21. The buffers 20, 21 are each arranged to hold a half-second segment of the corresponding channel of the sound passage being output by the CD player with the buffers becoming full in correspondence to the end of a processing cycle of the apparatus. At the start of the next processing cycle, the contents of the buffers are transferred to the correlator 22 after which filling of the buffers from the left and right audio channel signals recommences.

The correlator 22 (which is, for example, a digital signal processor) is operative to detect corresponding components by pairing left and right audio-channel tones, potentially offset in time, that match in pitch and in amplitude variation profile. Thus, for example, the correlator 22 can be arranged to sweep through the frequency range of the audio-channel signals and for each tone signal detected in one channel signal, determine if there is a corresponding signal in the other channel signal, potentially offset in time. If a corresponding tone signal is found and it has a similar amplitude variation profile over the time segment being processed, then these left and right channel tone signals are taken as forming a matching pair originating from a common sound source. The matched tones do not, in fact, need to be of a fixed frequency but any frequency variation in one must be matched by the same frequency variation in the other (again, allowing for a possible time offset).

For each matching pair of tones detected by the correlator 22, it feeds an output to a block 24 of the source-determination arrangement 23 giving the characteristic tone frequency (pitch), the average amplitude (across both channels for periods when the tones are present) and the amplitude variation profile of the matched pair; if the pitch of the tone varies, then the initial detected pitch is used for the characteristic pitch. The correlator 22 also outputs to a block 25 of the source-determination arrangement 23, measures of the amplitudes of the matched left and right channel tone signals and/or of their timing offset relative to each other. The block 25 uses these measures to determine an azimuth (that is, a left/right) location for the source from which the matched tone signals are assumed to have come. The determined azimuth location is passed to the block 24.

The block 24, on receiving the characteristic pitch, average amplitude, and amplitude variation profile of a matched pair of left and right channel tone signals as well as the azimuth location of the sound source from which these tones are assumed to have come, is operative to generate a corresponding new "located elemental sound" (LES) record 27 in located-sound memory 26. This record 27 records, against an LES ID, the characteristic pitch, average amplitude, amplitude variation profile, and azimuth location of the "located elemental sound" as well as a timestamp for when the LES was last detected (this may simply be a timestamp indicative of the current processing cycle or a more accurate timestamp, provided by the correlator 22, indicating when the corresponding tone signals ceased either at the end of the audio-channel signal segment being processed or earlier).

Where the correlator 22 detects a tone signal in one channel signal but fails to detect a corresponding tone signal in the other channel signal, the correlator can either be arranged simply to ignore the unmatched tone signal or to assume that there a matching signal but of zero amplitude value; in this latter case, a LES record is created but with an azimuth location being set to one or other extreme as appropriate.

After the correlator has completed its scanning of the current audio signal segment and LES records have been stored by block 25, a compound-sound identification block 28 examines the newly-stored LES records 27 to associate those LES that have the same azimuth location (within preset tolerance limits), the same general amplitude variation profile and are harmonically related; LESs associated with each other in this way are assumed to originate from the same sound source (for example, one LES may correspond to the fundamental of a string played on a guitar and other LES may correspond harmonics of that string; additionally/alternatively, one LES may correspond to one string sounded upon a chord being played on a guitar and other LES may correspond to other strings sounded in the same chord). The block 28 is set to look for predetermined harmonic relationships between LESs.

For each group of associated LES records 27 identified by the block 28, a corresponding "located compound sound" (LCS) record 29 is created by block 28 in the memory 26. Each LCS record 29 comprises:

- a LCS ID,
- an amplitude variation profile formed from a weighted average of the associated LES amplitude variation profiles, the weighting being set to favour the louder LESs (alternatively, for simplification, the amplitude variation profile of the loudest LES can be used instead);
- an harmonic profile giving the relative strengths of the different frequencies of the associated LESs as indicated by the average amplitudes recorded in records 27;
- an azimuth location formed from a weighted average of the azimuth locations of the associated LESs, the weighting being set to favour the louder LESs (again, for simplification, the azimuth location of the loudest LES can be taken instead); and
- a last detection timestamp corresponding to the most recent value of the last detection timestamps of the associated LESs.

The block 28 may be set to process the LESs created in one operating cycle of the correlator 22 and block 24, in the same operating cycle or in the next following operating cycle; in this latter case, appropriate measures are taken to ensure that block 28 does not try to process LES records being added by block 24 during its current operating cycle.

After the compound-sound identification block 28 has finished determining what LCS are present, a source identification block 30 is triggered to infer and record, for each LCS, a corresponding sound source in a sound source item record 34 stored in a source item memory 33. The block 30 is operative to determine the type of each sound source by matching the harmonic profile and/or amplitude variation profile of the LCS concerned with predetermined sound-source profiles (typically, but not necessarily limited to, musical instrument profiles). Each sound-source item record holds an item ID, the determined sound source type, and the azimuth position and last detection time stamp copied from the corresponding LCS.

Rather than the source identification block 30 carrying out its operation after the block 28 has finished LCS identification, the block can be arranged to create a new sound-source item record immediately following the identification of an LCS by the block 28.

If the source identification block 30 is unable to identify the type of a sound source inferred from an LCS, it nevertheless records a corresponding sound source item in memory 33 but without setting the type of the sound source.

The source identification block can also be arranged to infer sound sources in respect of any LESs recorded in memory 26 but which were not associated with an LCS by the block 28 (in order to identify these LESs, the LES records 27 can be provided with a flag field that is set when the corresponding LES is associated with other LES to form an LCS; in this case, any LES record that does not have its flag set, identifies an LES not associated with a LCS).

When the source identification block 30 has finished its processing, the corresponding LES and LCS records 27 and 29 are deleted from memory 26 (typically, this is at the end of the same or next operating cycle as when the correlator processed the audio-channel signal segment giving rise to the LES concerned).

Where sound-source items have been previously recorded from earlier processing cycles, the source identification block 30 is arranged to seek to match newly-determined LCS with the already-recorded sound sources and to only infer the presence of a new sound source if no such match is possible. Where an LCS is matched with an existing sound source item, the last detected timestamp of the sound-source item record 34 is updated to that of the LCS. Furthermore, in seeking to match an LCS with an existing sound source, a certain tolerance is preferably permitted in matching the azimuth locations of the LCS and sound source whereby to allow for the possibility that the sound source is moving; in this case, where a match is found, the azimuth location of the sound source is updated to that of the LCS.

The display processing stage 35 is operative to repeatedly scan the source item memory 33 (synchronously or asynchronously with respect to the processing cycles of the source-determination arrangement 23) to determine what sound source items have been identified and then to cause the display on display 16 of a visual indication of each such sound source item and its azimuth location in the audio field. This is preferably done by displaying representations of the sound source items in a spatial relation corresponding to that of the sources themselves. Advantageously, each sound-source representation is indicative of the type of the corresponding sound source, appropriate image data for each type of source item being stored in source item visualization data memory 32 and being retrieved by the display processing stage 35 as needed. The form of representation used can also be varied in dependence on whether the last-detected timestamp recorded for a source item is within a certain time window of the current time; if this is the case then the sound source is assumed to be currently active and a corresponding active image (which may be an animated image) is displayed whereas if the timestamp is older than the window, the sound source is taken to be currently inactive and a corresponding inactive image is displayed.

Rather than all the sound source items being represented at the same time, the display processing stage can be arranged to display only those sound sources that are currently active or that are located within a user-selected portion of the audio field (this portion being changeable by the user). Furthermore, rather than a sound source item having existence from its inception to the end of the sound passage of interest regardless of how long it has been inactive, a sound source item that remains inactive for more than a given period as judged by its last-detected timestamp, can be deleted from the memory 33.

In addition to determining the azimuth location of each detected sound source, the source-determination arrangement 23 can be arranged to determine the depth (radial distance from the user) and/or height location of each sound source. Thus, for example, the depth location of a sound source in the audio field can be determined in dependence on the relative loudness of this sound source as compared to other sound sources. This can conveniently be done by storing in each LCS record 29 the largest average amplitude value of the associated LES records 27, and then arranging for block 30 to use these LCS average amplitude values to allocate depth values to the sound sources.

As regards the height location of a sound source in the audio field, if the audio channel signals have been processed to simulate a pinna notch effect with a view to enabling a human listener to perceive sound source height, then the block 30 can also be arranged to determine the sound source height by assessing the variation with frequency of the relative amplitudes of different harmonic components of the compound sound associated with the sound source as compared with the variation expected for the type of the sound source. In this case, the association of LESs with a particular LCS are preferably explicitly stored, for example, by each LES record 27 storing the LCS ID of the LCS with which it is associated.

With regard to visually representing the depth and height of a sound source, height is readily represented whereas depth can be shown by scaling a displayed sound-source representing image in dependence on its depth (the greater the depth value of the sound source location, the smaller the image).

Figure 3:
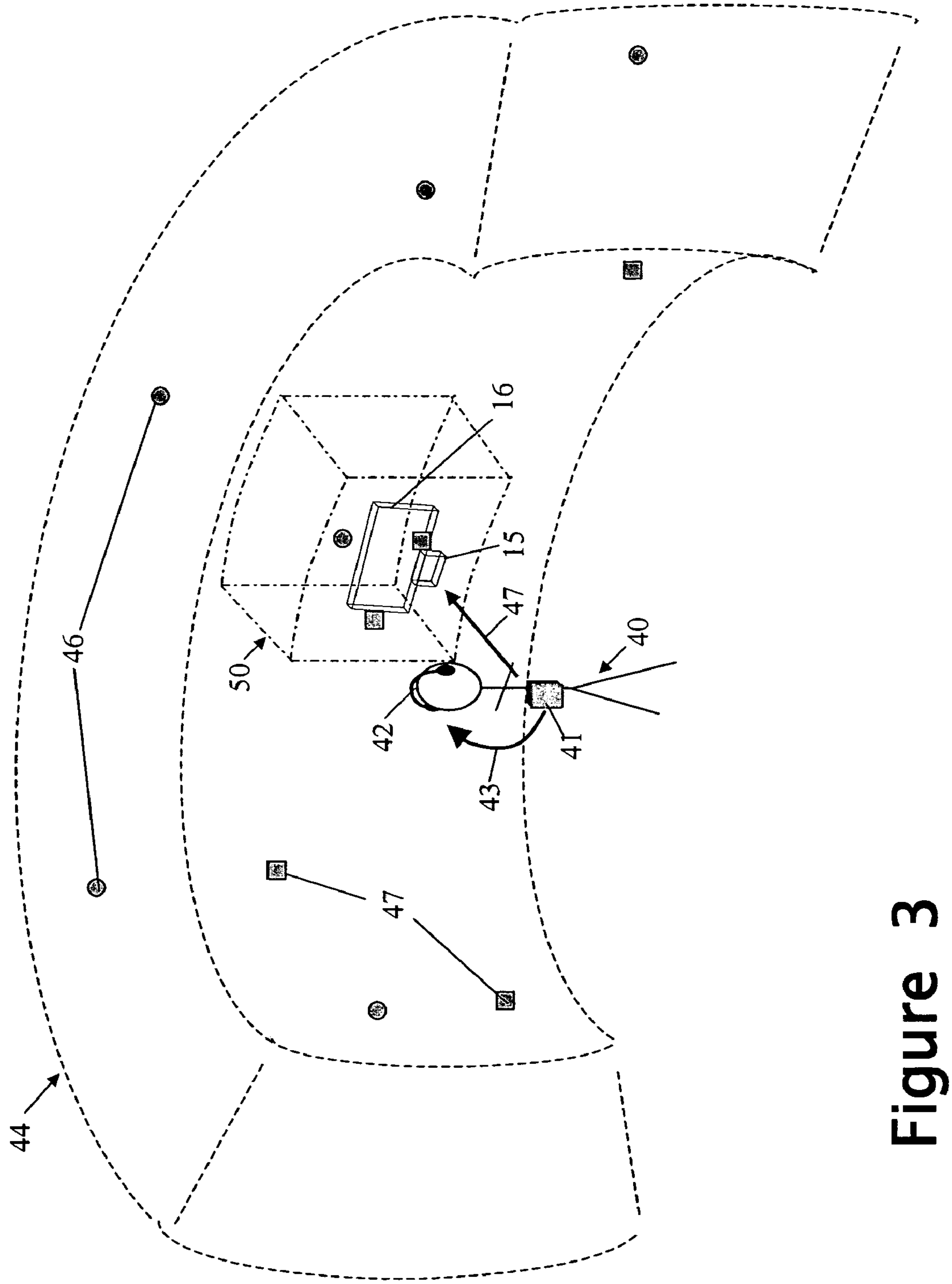
FIG. 3 is a diagram showing the visualization of a focus volume of a 3D audio field experienced by a user having portable audio equipment.

FIG. 3 illustrates the visualization of a focus volume 50 of a 3D audio field 44 experienced by a user 40 having portable audio equipment comprising a belt-carried unit 40 that sends left and right audio channel output signals wirelessly to headphones 42 (as indicated by arrow 43). The 3D audio field 44 presented to the user via the headphones 42 extends part way around the user 40 and has depth and height; the field 44 comprises user-perceived sound sources 46 and 47, the sound sources 46 (represented by small circles in FIG. 3) having a greater depth value than the sources 47 (represented by small squares).

In the FIG. 3 arrangement, visualization apparatus 15 and an associated display 16 are provided separately from the user-carried audio equipment; the apparatus 15 and display 16 are, for example, mounted in a fixed location. The left and right audio channel signals output by unit 40 to headphones 42 are also supplied (arrow 47) to the visualization apparatus 15 using the same or a different wireless communication technology. In the present example, the visualization apparatus is arranged to present on display 16 visual indications of the sound sources determined as present in the focus volume 50 of the audio volume 50. The position of the focus volume within the audio field 44 is adjustable by the user using a control input (not shown but which could be manual or any other suitable form, including one using speech recognition technology) provided either on the user-carried equipment or on the visualization apparatus 15.

As an alternative to the visualization apparatus 15 being associated with the fixed display in FIG. 3, the apparatus 15 could be provided as part of the user-carried equipment; in this case, the output of the display processing stage 35 would be passed by a wireless link to the display 16.

It will be appreciated that many variants are possible to the above described embodiments of the invention. In particular, the degree of processing effected by the correlator 22 and the source determination arrangement 23 in detecting sound sources can be tailored to the available processing power. For example, rather than every successive audio channel signal segment being processed, only certain segments can be processed, such as every other segment or every third segment. Another processing simplification would be only to consider tones having more than a certain amplitude thereby reducing the processing load concerned with harmonics. Identification of source type can be done simply on the basis of the pitch and amplitude profile and in this case it is possible to omit the identification of "located compound sounds" (LCS) though this is likely to lead to the detection of multiple co-located sources unless provision is made to consolidate such sources into a single source. Determining the type of a sound source item is not, of course, essential. The duration of each audio channel segment can be made greater or less than the half a second described above.

Where ample processing power is available, then the correlator and source determination arrangement can be arranged to operate on a continuous basis rather than on discrete segments.

The above-described functional blocks of the correlator 22 and source-determination arrangement 23 can be implemented in hardware and/or in software. Furthermore, analogue forms of these elements can also be implemented.

The invention claimed is:

1. A method of providing a visual indication of the likely user-perceived location of sound sources in an audio field generated from left and right audio channel signals, the method comprising the steps of:

(a) receiving the left and right audio channel signals;

(b) pairing components in the left and right channel signals by detecting left and right channel components, potentially offset in time, that match in pitch and in amplitude variation profile and using the paired components to infer the presence of at least one sound source and determine its azimuth location; and (c) displaying a visual indication of at least one sound source inferred in step (b) such that the position at which this indication is displayed is indicative of the azimuth location of the at least one sound source.

2. A method according to claim 1, wherein in step (b) each component pairing being recorded as representing an elemental sound located in azimuth in said audio field at a position determined by the relative amplitude of the left and right channel components and/or their timing offset relative to each other.

3. A method according to claim 2, wherein in step (b) elemental sounds that have the same azimuth location, the same general amplitude variation profile and are harmonically related, are associated into a compound sound.

4. A method according to claim 3, wherein in step (b) the or each compound sound is used to infer the presence of a corresponding sound source with the type of that sound source being determined according to the harmonic profile and/or amplitude variation profile of the compound sound concerned.

5. A method according to claim 4, wherein in the course of a sound passage represented by the left and right audio channel signals, step (b) is carried out repeatedly with the elemental and compound sounds being newly determined at each repetition but sound sources inferred as present during any repetition having a continuing existence across at least one subsequent repetition.

6. A method according to claim 4, wherein in the course of a sound passage represented by the left and right audio channel signals, step (b) is carried out repeatedly or on an on-going basis with sound sources inferred as present at any stage having a continuing existence, step (b) involving seeking to match newly-determined compound sounds with known sound sources and only inferring the presence of a new sound source if no such match is possible.

7. A method according to claim 6, wherein in seeking to match newly-determined compound sounds with known sound sources, limited differences in location are allowed between the newly-determined compound sound and a candidate matching sound source the location of which is taken to be that of a previous compound sound associated with the sound source; said limited differences in location serving to allow for movement of the sound source in the audio field.

8. A method according to claim 4, wherein in step (c) at least one sound source inferred as present in step (b) is visually indicated by a visual element representative of the type of sound source.

9. A method according to claim 8, wherein in the course of a sound passage represented by the left and right audio channel signals, step (b) is carried out repeatedly or on an on-going basis with sound sources inferred as present at any stage continuing to be visually represented in step (c) even after the corresponding compound sounds are no longer detected.

10. A method according to claim 9, wherein the visual representation of a said sound source is varied according to whether or not a compound sound corresponding to the sound source has been recently detected.

11. A method according to claim 1, wherein the depth location of a said sound source in the audio field is determined in dependence on the loudness of this sound source, the determined depth location being reflected in the displayed visual indication of the sound source.

12. A method according to claim 4, wherein the height location of a said sound source in the audio field is determined in dependence on the variation with frequency of the relative amplitudes of different harmonic components of the compound sound associated with the sound source as compared with the variation expected for the type of the sound source, the determined height location being reflected in the displayed visual indication of the sound source.

13. A method according to claim 1, wherein in step (c) visual indications are displayed for only those sound sources located within a portion of said audio field, the position of this portion within the audio field being selectable by the user.

14. Apparatus for providing a visual indication of the likely user-perceived location of sound sources in an audio field generated from left and right audio channel signals, the apparatus comprising:

an input interface for receiving the left and right audio channel signals;

a correlation arrangement for pairing components in the left and right channel signals by detecting left and right channel components, potentially offset in time, that match in pitch and in amplitude variation profile;

a source-determination arrangement for using the paired components to infer the presence of at least one sound source and determine its azimuth location; and a display processing arrangement for causing the display, on a display connected thereto, of a visual indication of at least one sound source inferred by the source-determination arrangement such that the position at which this indication is displayed, is indicative of the azimuth location of the at least one sound source.

15. Apparatus according to claim 14, wherein the source-determination arrangement is arranged to record each component by the correlation arrangement as representing an elemental sound located in azimuth in said audio field at a position determined by the relative amplitude of the left and right channel components and/or their timing offset relative to each other.

16. Apparatus according to claim 15, wherein source-determination arrangement is arranged to associate, into a compound sound, elemental sounds that have the same azimuth location, the same general amplitude variation profile and are harmonically related.

17. Apparatus according to claim 16, wherein the source-determination arrangement is arranged to use the or each compound sound to infer the presence of a corresponding sound source with the type of that sound source being determined according to the harmonic profile and/or amplitude variation profile of the compound sound concerned.

18. Apparatus according to claim 17, wherein the correlation arrangement and source-determination arrangement are arranged such that, in the course of a sound passage represented by the left and right audio channel signals, they carry out their respective functions repeatedly with the elemental and compound sounds being newly determined at each repetition but sound sources inferred as present during any repetition being remembered by the source-determination arrangement across at least one subsequent repetition.

19. Apparatus according to claim 17, the correlation arrangement and source-determination arrangement are arranged such that, in the course of a sound passage represented by the left and right audio channel signals, they carry out their respective functions repeatedly or on an on-going basis, the source-determination arrangement being further arranged to remember sound sources inferred as present at any stage and to seek to match newly-determined compound sounds with known sound sources and only infer the presence of a new sound source if no such match is possible.

20. Apparatus according to claim 19, wherein the source-determination arrangement is arranged to permit, in seeking to match newly-determined compound sounds with known sound sources, limited differences in location between the newly-determined compound sound and a candidate matching sound source the location of which is taken to be that of a previous compound sound associated with the sound source.

21. Apparatus according to claim 17, wherein the display processing arrangement is arranged to cause at least one sound source inferred as present by the source-determination arrangement to be visually indicated on said display by a visual element representative of the type of sound source.

22. Apparatus according to claim 21, wherein the correlation arrangement and source-determination arrangement are arranged such that, in the course of a sound passage represented by the left and right audio channel signals, they carry out their respective functions repeatedly or on an on-going basis, the display processing arrangement being arranged to cause sound sources inferred as present at any stage to continue to be visually indicated on said display even after the corresponding compound sounds are no longer detected.

23. Apparatus according to claim 22, wherein the display processing arrangement is arranged to cause the visual representation of a said sound source to be varied according to whether or not a compound sound corresponding to the sound source has been recently detected.

24. Apparatus according to claim 14, wherein the source-determination arrangement is further arranged to determine the depth location of a said sound source in the audio field in dependence on the loudness of this sound source, the display processing arrangement being arranged to cause the determined depth location to be reflected in the displayed visual indication of the sound source.

25. Apparatus according to claim 17, wherein the source-determination arrangement is further arranged to determine the height location of a said sound source in the audio field in dependence on the variation with frequency of the relative amplitudes of different harmonic components of the compound sound associated with the sound source as compared with the variation expected for the type of the sound source, the display processing arrangement being arranged to cause the determined depth location to be reflected in the displayed visual indication of the sound source.

26. Apparatus according to claim 14, wherein the display processing arrangement is arranged to cause visual indications to be displayed for only those sound sources located within a portion of said audio field, the display processing arrangement including a user-controllable input device for selecting the position of this portion within the audio field.

* * * * *